US010235146B1

(12) United States Patent
Totale et al.

(10) Patent No.: US 10,235,146 B1
(45) Date of Patent: Mar. 19, 2019

(54) METHOD AND MECHANISM FOR COMPOSITE DATA SERVICE GENERATION AND IMPLEMENTATION

(71) Applicant: EMC IP Holding Company LLC, Hopkinton, MA (US)

(72) Inventors: Sachin Gopaldas Totale, Pleasanton, CA (US); Naveen Vidyananda, Bangalore (IN); Roshan Prakash Salvi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 22 days.

(21) Appl. No.: 15/798,694

(22) Filed: Oct. 31, 2017

Related U.S. Application Data

(62) Division of application No. 14/871,425, filed on Sep. 30, 2015, now abandoned.

(51) Int. Cl.
*G06F 9/445* (2018.01)
*G06F 8/60* (2018.01)
*H04L 29/08* (2006.01)

(52) U.S. Cl.
CPC ............... *G06F 8/60* (2013.01); *H04L 67/02* (2013.01)

(58) Field of Classification Search
CPC ...................................................... G06F 9/445
USPC .................................................. 717/174–178
See application file for complete search history.

(56) References Cited

U.S. PATENT DOCUMENTS

| 9,009,657 | B2 | 4/2015 | Zhu et al. |
| 9,122,484 | B2 | 9/2015 | Hui et al. |
| 2008/0222599 | A1 | 9/2008 | Nathan et al. |
| 2010/0083222 | A1 | 4/2010 | Maximilien et al. |
| 2011/0191786 | A1 | 8/2011 | Ma et al. |
| 2012/0096429 | A1* | 4/2012 | Desai ................. G06F 8/34 717/107 |
| 2014/0095974 | A1 | 4/2014 | Cui et al. |
| 2014/0282394 | A1 | 9/2014 | Karimisetty et al. |
| 2015/0081798 | A1 | 3/2015 | Lee et al. |
| 2015/0222525 | A1* | 8/2015 | Mercuri ............ G06F 9/5027 709/241 |
| 2015/0268949 | A1* | 9/2015 | Huber ............. G06F 17/3089 717/120 |
| 2015/0365460 | A1 | 12/2015 | Miller |

* cited by examiner

*Primary Examiner* — Jae U Jeon
(74) *Attorney, Agent, or Firm* — Chamberlain, Hrdlicka, White, Williams & Aughtry (57) ABSTRACT

In general, embodiments of the technology relate to implementing a composite data service in a web application. More specifically, embodiments of the technology enable a web application designer to create a composite data service that takes one or more inputs, generates one or more outputs, and that uses two or more data services (composite or non-composite) to generate the output(s) based on the one or more inputs. The composite data service, in one or more embodiments of the technology, enables a webpage to implement transactions that require the use of two or more individual data services.

7 Claims, 10 Drawing Sheets

METHOD AND MECHANISM FOR COMPOSITE DATA SERVICE GENERATION AND IMPLEMENTATION

BACKGROUND

A network is a set of interconnected computing devices that may communicate with each other. Web applications are applications that are developed for the network that include a series of web pages. Each web page may include a button or other navigation control that enables users of the web application to obtain content from repositories.

DETAILED DESCRIPTION

Specific embodiments of the disclosed technology will now be described in detail with reference to the accompanying figures. In the following detailed description of embodiments of the disclosed technology, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

In the following description of FIGS. 1-8, any component described with regard to a figure, in various embodiments of the disclosed technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the disclosed technology, any description of the components of a figure is to be interpreted as an optional embodiment which may be implemented in addition to, in conjunction with, or in place of the embodiments described with regard to a corresponding like-named component in any other figure.

In general, embodiments of the technology relate to implementing a composite data service in a web application. More specifically, embodiments of the technology enable a web application designer to create a composite data service that takes one or more inputs, generates one or more outputs, and that uses two or more data services (composite or non-composite) to generate the output(s) based on the one or more inputs. The composite data service, in one or more embodiments of the technology, enables a webpage to implement transactions that require the use of two or more individual data services, where the individual data services themselves do not natively support transactions.

The term "web application" is used herein to generically refer to the web application executable, the web application design, or another form of the web application. Web applications include webpages. A webpage is an output of the web application that is displayed on a web browser. As used in the detailed description and claims, a developer is an individual or group of individuals that creates composite data services and/or web applications. An end user is an individual or group of individuals that uses the web application once the web application is developed. Further, an individual or group is deemed to perform an action when an action is performed on behalf of the individual. The entity performing the action may be one or more other individuals, an organization, a device, or a combination thereof.

Figure 1:
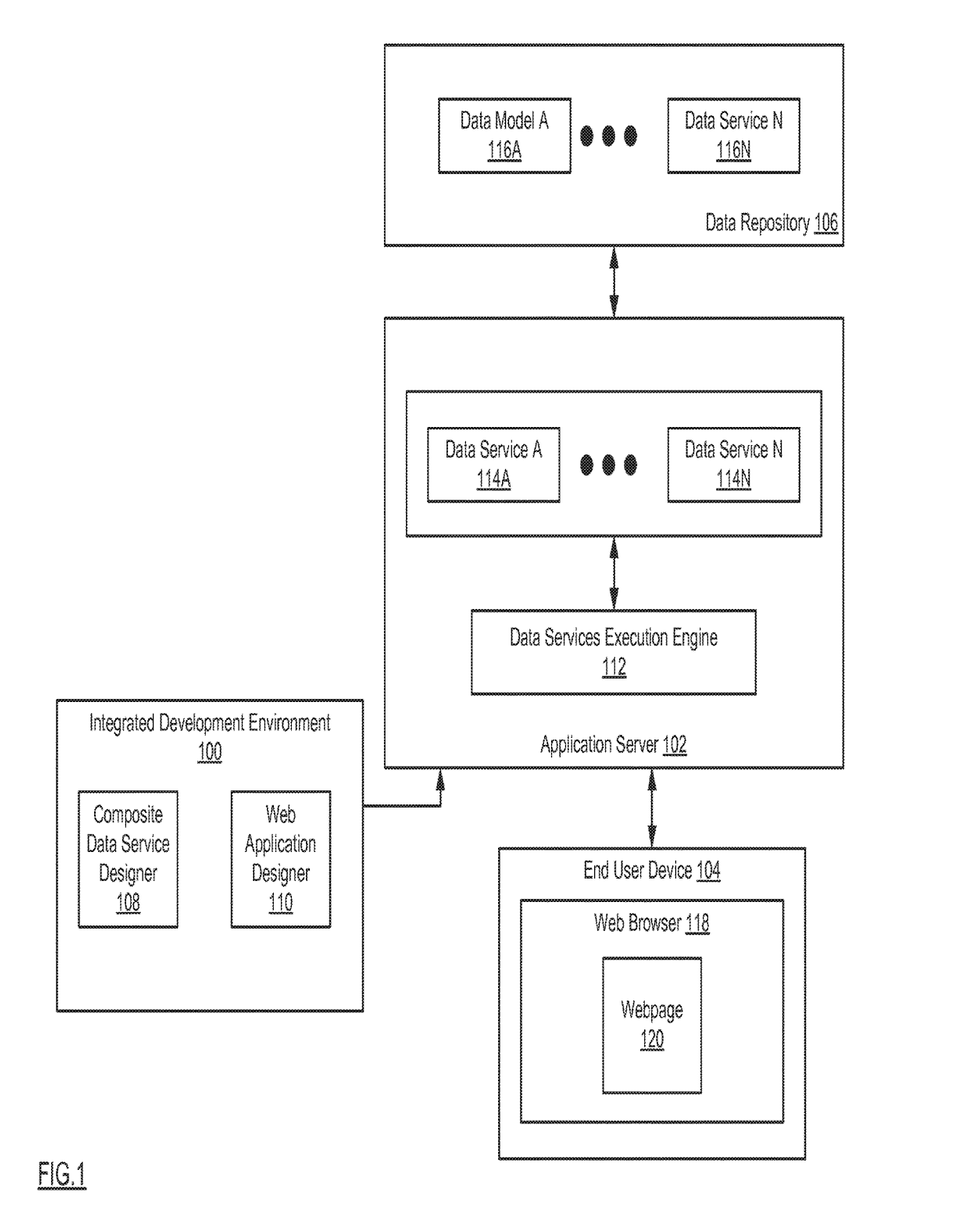
FIG. 1 shows an example system in accordance with one or more embodiments of the disclosed technology.

FIG. 1 shows a system in accordance with one or more embodiments of the technology. The system includes an integrated development environment (IDE) (100), an application server (102), and a data repository (106). Each of these components is described below.

In one embodiment of the technology, the IDE (100) is implemented on a computing system such as the one shown in FIG. 8 and described below. The IDE (100) is a set of software development tools that a user may use to create and deploy a composite data services and/or that allows a user to build a web application that uses the composite data service(s). Further, the IDE (100) may include a user interface that facilitates the development of composite data services (see e.g. FIGS. 4A-4D) and the development of web applications in accordance with one or more embodiments of the technology.

In one embodiment of the technology, the IDE includes a composite data service designer (108). The composite data service designer (108) is a set of software development tools that provide a user (e.g., a developer) with functionality to create composite data services. More specifically, the composite data service designer (108) may include functionality to implement the method shown in FIG. 3. Additional detail about the composite data service designer is described in FIGS. 4A-4D below.

In one embodiment of the technology, the IDE includes a web application designer (110). The web application designer (110) is a set of software development tools that provide a user (e.g., a developer) with functionality to create web applications. More specifically, the web application designer (110) may include functionality to import a composite data service. Once imported, the user may then implement the composite data service in a webpage(s) of the web. The web application designer (110) may also include functionality to generate a deployed web application (not shown) that implements the composite data service. Additional details related to the implementation of a composite data service in a web application are described below and shown in FIGS. 5-7.

Those skilled in the art will appreciate the composite data service designer (108) and the web application designer (110) may be implemented in separate IDEs on separate computing systems without departing from the technology.

In one embodiment of the technology, an application server (102) is a computing system (e.g., a computing system described in FIG. 8) that includes functionality to host a deployed web application. Hosting the deployed web application may include storing the necessary files including source code, images, third party libraries, etc. and then executing the deployed web application. Executing the deployed web application may include receiving HTTP requests from an end user device (104), processing the HTTP requests, generating HTTP responses based on the processing of the HTTP requests, and providing the HTTP responses to the end user device.

In one embodiment of the technology, the application server (102) may communicate (e.g., send and receive HTTP requests) with one or more end user devices (e.g., the computing systems in FIG. 8) over any wired network, wireless network, or other network that includes any combination of wired networks or wireless networks. In one embodiment of the technology, the end user devices (104) each include at least one web browser (118) that permits the end user device to display webpages (120) (provided with HTTP responses) to the end users.

In one embodiment of the technology, the application server (102) implements a data services execution engine (112) and one or more data services (114A, 114N).

In one embodiment of the technology, a data service provides a mechanism to enable a web application to interact with data from a data model (116A, 116N). The data service may implement one or more methods (e.g., create, delete, update, and get) to enable the web application to interact with the data model. One or more data services may be automatically generated when a data model is created and stored in the data repository (106).

In one embodiment of the technology, the data service is a RESTful web service. More specifically, in one or more embodiments of the technology, a data service implements a Representational State Transfer (REST) architecture. Accordingly, the data (which may be in any format, e.g., HTML, PDF, JPEG, JSON, XML, plain text) stored in, e.g., a repository (also referred to as a resource) that is manipulated by the data service is accessible via a universal resource identifier (URI). Further, the data service may expose/implement the following fixed set of operations on the data stored within the resource: create, read, update, delete. In addition, requests to perform the aforementioned operations on data within the resource are stateless (i.e., the requests issued to the data service are self-contained).

Figure 5:
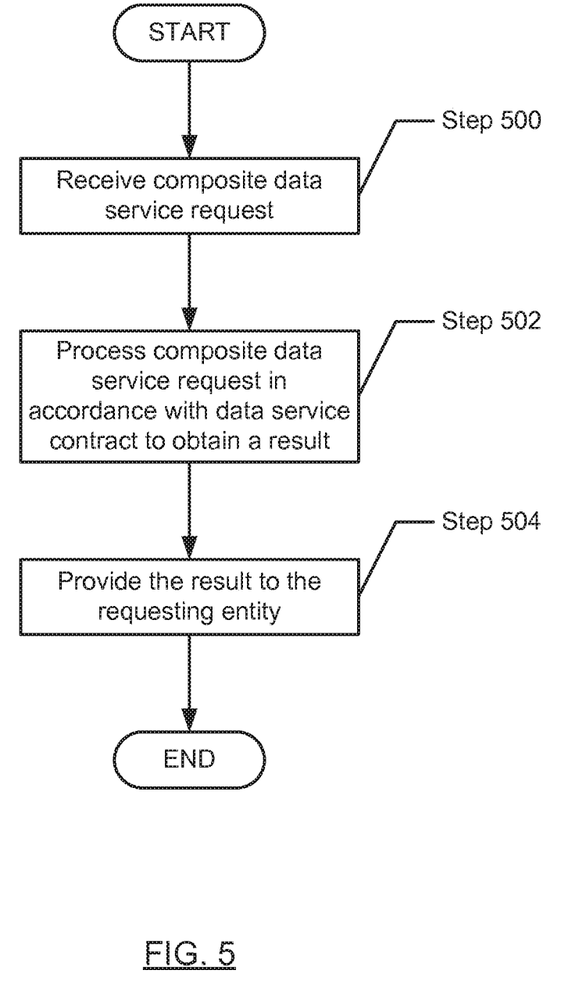
FIG. 5 shows an example method for processing composite data service requests in accordance with one or more embodiments of the disclosed technology.

In one embodiment of the technology, the data services execution engine (112) includes functionality to implement a composite data service in accordance with the data services contract specified for the composite data service (see e.g., FIG. 5). More specifically, the data services execution engine includes functionality to: (i) issue calls to one or more data services; (ii) receive responses from the one or more data services; and (iii) generate a result based on (i) and (ii). The data services execution engine also includes functionality to handle data service failures and, optionally, take remedial action.

In one embodiment of the technology, the specific calls to the individual data services that the data services execution engine makes in response to a composite data services request are performed in a manner that is transparent to the end user device. Said another way, from the perspective of the end user device, the composite data service appears as a non-composite data service.

Additional detail about the data services execution engine is described in FIGS. 5-7 below.

In one embodiment of the technology, the data repository (106) includes persistent storage configured to store one or more data models (116A, 116N). Each of the data models includes a combination of data elements (i.e., individual pieces of data) and information about how the data elements are related to each other. Said another way, the data models may include data and corresponding metadata associated with the data.

The technology is not limited to the system configuration shown in FIG. 1. Further, while FIG. 1 shows single instances of various system components, those skilled in the art will appreciate that the system may be multiple instances of one or more system components without departing from the technology.

Figure 2:
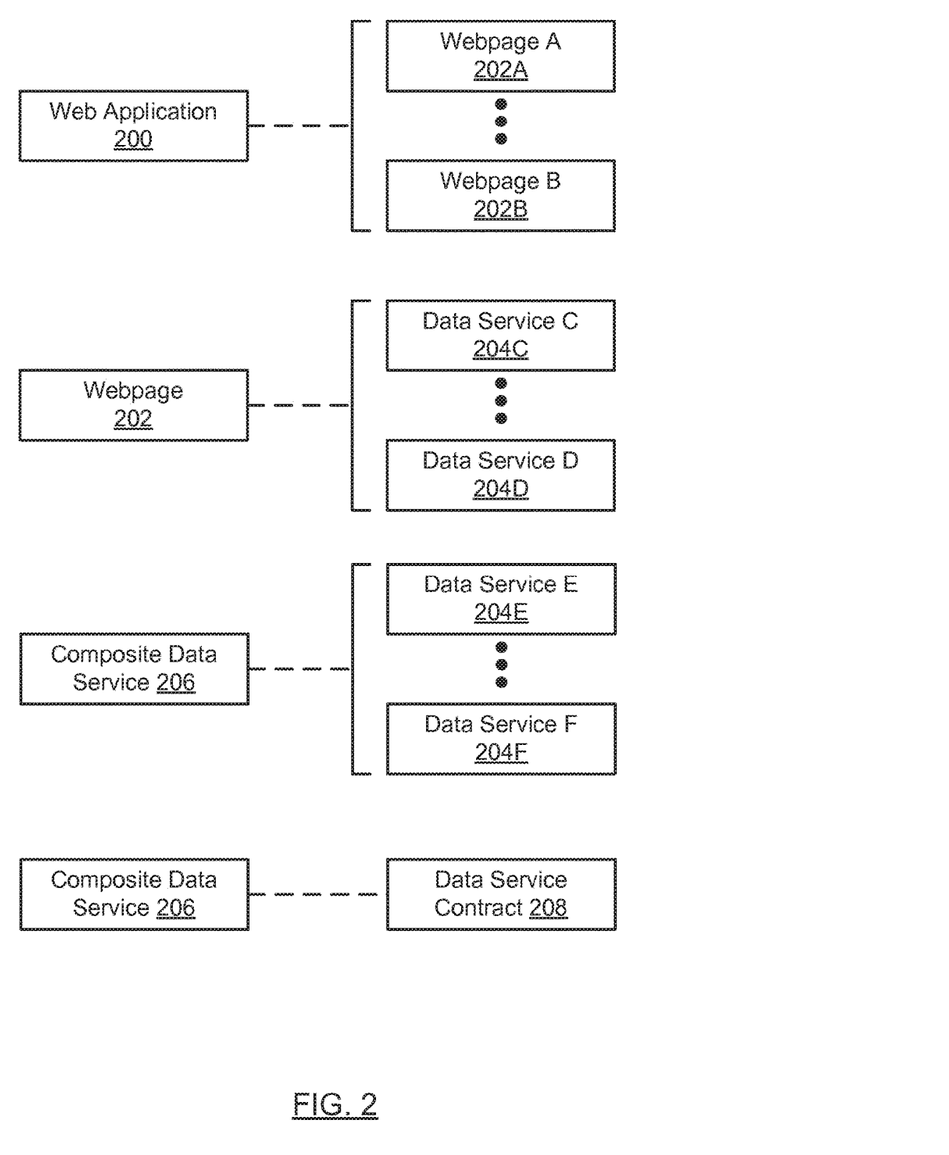
FIG. 2 shows the relationship between various components in the example system in accordance with one or more embodiment of the disclosed technology.

FIG. 2 shows the relationship between various components in the system in accordance with one or more embodiment of the disclosed technology. The application server (102) may include one or more data structures to one or more of the following relationships.

In one embodiment of the disclosed technology, each web application (200) includes one or more webpages (202A, 202B). Further, each webpage (202) includes zero, one or more data services (204C, 204D), where the data services may be composite data services or non-composite data services (i.e. individual data services).

In one embodiment of the disclosed technology, each composite data service (206) includes two or more data services (204E, 204F). Further, each composite data service (206) is associated with a data service contract (208). In one embodiment of the technology, the data service contract defines the composite data service. More specifically, the data service contract may, for example, specify the data services that are part of the composite data service, the order in which the individual data services execute, the relationship between the data services, what inputs are required by the composite data service, what output the data service generates, and what rollback actions (if any) are implemented by the composite data service. Additional detail about the generation of the composite data service is described below with respect to FIGS. 3-4D.

Turning to the flowcharts, while the various steps in the flowcharts are presented and described sequentially, one of ordinary skill will appreciate that some or all of the steps may be executed in different orders, may be combined or omitted, and some or all of the steps may be executed in parallel.

Figure 3:
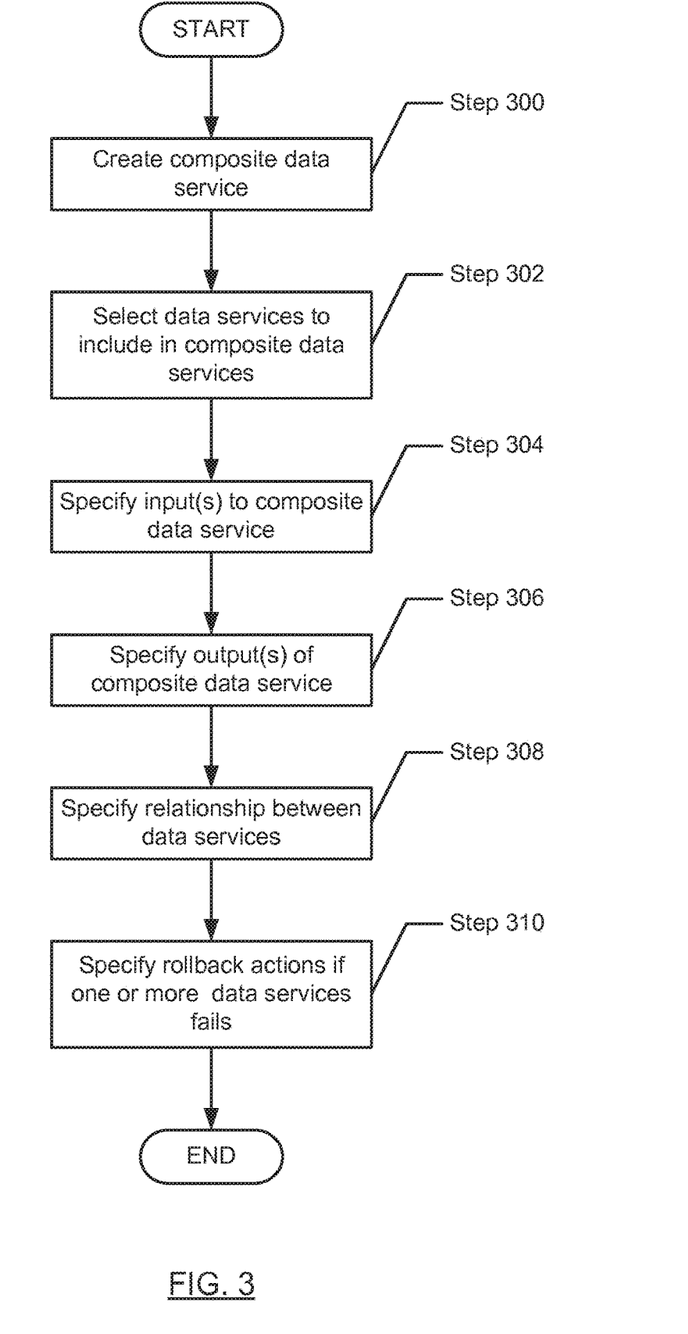
FIG. 3 shows an example method for creating a composite data service in accordance with one or more embodiments of the disclosed technology.

FIG. 3 shows a method for creating a composite data service in accordance with one or more embodiments of the disclosed technology.

In Step 300, the composite data service is created. More specifically, the creation of a composite data service is initiated and a name for the composite data service is specified.

In Step 302, two or more data services are selected to be included in the composite data service. More specifically, the user (e.g., the developer) may be presented with a set of all possible data services that may be included as part of the composite data service. The data services presented to the user may be individual data services and/or may be other composite data services. In the latter case, a composite data service may itself include one or more individual data services and one or more composite data services. Said another way, a given composite data service may include any combination of individual (or non-composite data services) and composite data services.

In Step 304, the inputs to the composite data service are specified. The inputs correspond to data (or metadata) that may be provided to the composite data service. In other embodiments of the technology, the composite data service may not require any inputs to be specified when the composite data service is executed in the deployed web application (see e.g., FIG. 5).

In Step 306, the outputs of the composite data service are specified. The outputs correspond to the data, metadata, or notifications, provided to the web application upon successful execution of the composite data service.

In Step 308, the relationships between the data services selected in step 302 are specified. The relationships may specify, for example: (i) the order in which the data services are executed; (ii) what information is passed between the aforementioned data services (see e.g., FIG. 6); and/or (iii) the numbers of times each of the data services is executed (see e.g., FIG. 7). Additional information about the relationship between the various data services may be specified without departing from the technology.

In Step 310, one or more rollback actions is specified if one or more data services fails. More specifically, a rollback action defines what action(s) the data services execution engine (112) may take in response to a particular data service failing. The possible actions may include, but are not limited to: (i) inform the web application that the composite data service has failed; (ii) inform the web application that at least a portion of the composite data service has failed (or was successful); and/or (iii) re-send the request to the failed data service a certain number of additional times prior to determining performed (i) or (ii).

Though not shown in FIG. 3, the data service contract may also specify various conditions that must be satisfied in order for a composite data service request to be processed. See e.g., FIG. 5. If the conditions are not satisfied, the composite data service request may not be processed. Further, the data service contract may also specify pre-processing steps that may be performed on input that is provided as part of the composite data service request. Once the input has been pre-processed (see e.g. FIG. 7), the data services execution engine may proceed to issue requests to one or more data services (as specified in the data service contract).

The aforementioned information, e.g., the information obtained in steps 300-310, may be stored in a data services contract that is provided to the data services execution engine. The data services contract may be stored in the data repository (106) (or in another location that is accessible to the data services execution engine).

FIGS. 4A-4D show an example method for creating a composite data service in accordance with one or more embodiments of the disclosed technology. The example is not intended to limit the scope of the technology.

Turning to the example, consider a scenario in which a developer, using the composite data service designer (108) is generating a composite data service that performs the following actions in a single composite data service: (i) create employee; (ii) create employee address; and (iii) relate employee and address. Each of the individual actions is implemented by a different data service. Using embodiments of the technology, these three actions may be performed in a single transaction. Further, the designer does not need to create custom code within the web application to implement these three actions as a single transaction: rather, the designer may use the composite data service designer (108) to specify the composite data service. Once specified, the composite data service may be implemented by the data services execution engine (see e.g., FIG. 5).

Figure 4A:
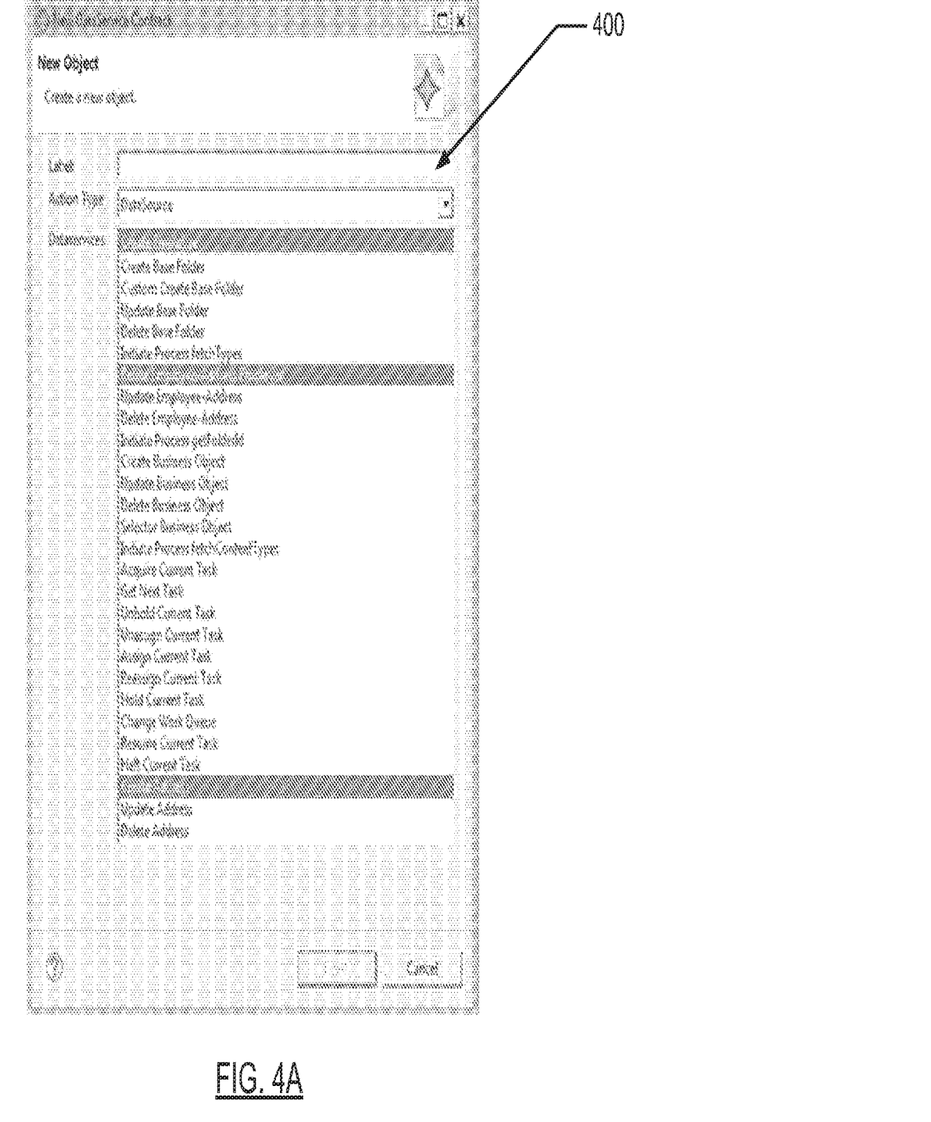
FIGS. 4A, 4B, 4C, and 4D show an example method for creating a composite data service in accordance with one or more embodiments of the disclosed technology.
Figure 4B:
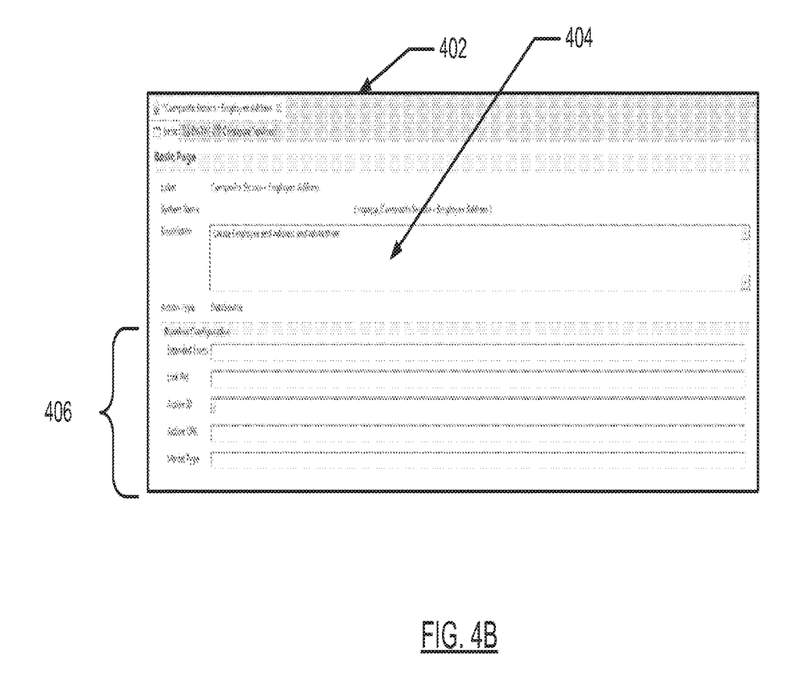

With respect to FIG. 4A, the developer is presented with a user interface (UI) element that shows all the possible data services that may be included within the composite data service. Further, via the UI element, the developer selects three individual data services: "Create Employee", "Relate-Employee-Address Employee" and "Create Address". The developer subsequently specifies, via the label field (400), a name for the composite data service. In this example, with reference to FIG. 4B, the name of the composite data service is "Composite Service—Employee Address". The developer, via the UI element (402), provides a description of the composite data service, and specifies the runtime configuration (406) of the composite data service, where runtime configuration (406) defines how the composite data service may be invoked at runtime.

Figure 4C:
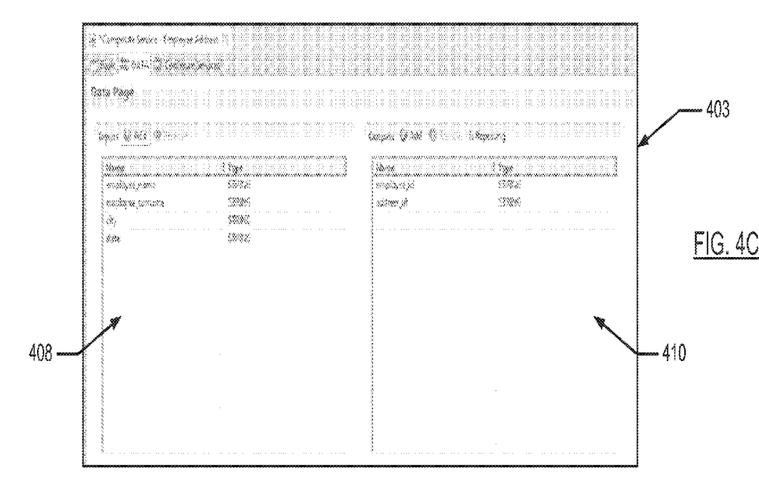

With reference to FIG. 4C, the developer, via the UI element (403), also specifies the input (408) and the output (410) for the composite data service (see e.g., FIG. 3, steps 304, 306). Further, with reference to FIG. 4D, the individual data services that will be invoked during the execution of the composite data service are further configured. More specifically, in one or more embodiments of the technology, the order in which the data services are listed within the UI element (412) dictates the order in which the listed data services are executed.

Figure 4D:
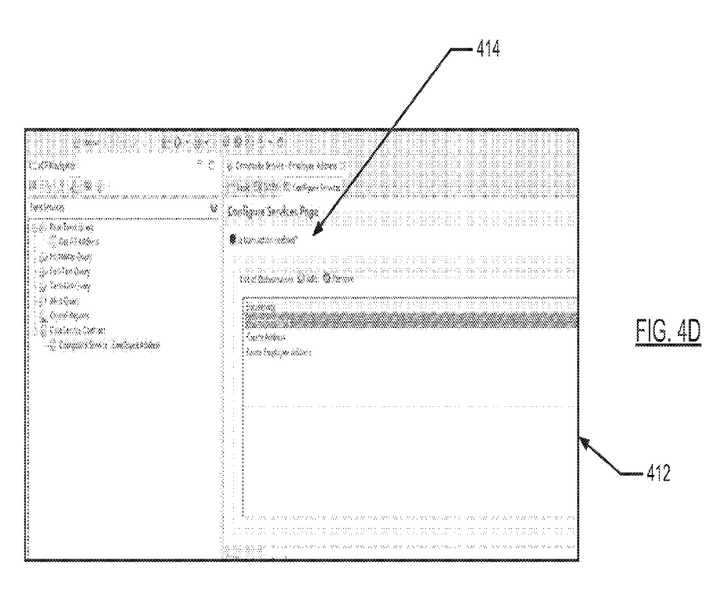

Further, though not shown in FIG. 4D, the developer via a UI element also specifies the inputs and outputs for individual data services. Finally, the developer, via the UI element (412), specifies whether execution of the data services that are part of the composite data service should be treated as a single transaction (414). In this example, the user specifies that the execution of the individual data services should be treated as a single transaction. Accordingly, if execution of any of the individual data services fails, then execution of the composite data service also fails. At this stage, the composite data service may be incorporated in to one or more web pages in a web application.

In one embodiment of the technology, once the composite data services are created (see e.g., FIG. 3), the composite web services may be incorporated into one or more pages in the web application. More specifically, from the perspective of the developer, the composite data service appears as a RESTful web service and may be implemented in the same manner as a non-composite data service. Further, the complexity of the composite data service (e.g., all the information that is specified in the data service contract) is typically hidden from the developer. Said another way, the developer may only be aware of the inputs to the composite data service and the corresponding output to the composite data service without any knowledge of the internal operation of the composite data service.

FIG. 5 shows an example method for processing composite data service requests in accordance with one or more embodiments of the disclosed technology.

In Step 500, a composite data service request is received from a requesting entity (e.g., from an end user device, from the data services execution engine if the composite data services are nested, etc.). In one embodiment of the technology, the composite data service request corresponds to an HTTP request that includes a URI for the resource (e.g., the data being requested) and an input(s) for the composite data service. The URI may include the input(s) for the composite data service. The composite data service request may be received by the application server and then forwarded to the data services execution engine for processing. The data services execution engine may be used to process all data service requests (i.e., composite data service request and non-composite data service requests) or it may be used to only process composite data service requests.

In one embodiment of the technology the composite data service request may be generated by the web browser in response to a user performing an action (e.g., selecting a button) on a web page displayed in the web browser.

In step 502, the composite data service request is processed in accordance with the corresponding data service contract (e.g., as defined in FIG. 3). More specifically, in one embodiment, the data services execution engine receives the composite data service request and subsequently obtains the corresponding data service contract. Once the data service contract is obtained, the data services execution engine proceeds to process the composite data service request in accordance with the data service contract.

Processing the request in accordance with the data service contract may include, for example, determining whether to treat the execution of the composite data services request as a single transaction. In such cases, the data services execution engine may create a transaction and then proceed to execute the data services in the manner specified in the data service contract. While the transaction is pending (i.e., while the one or more data services that are part of the composite data service are executing), a failure of any of the data service may result in a rollback action being performed (as discussed above).

If all data services specified in the data service contract execute successfully (i.e., execute in the manner specified in the data service contract), then the transaction is completed and subsequently closed by the data services execution engine. Alternatively, if any of the data services fail, then the transaction may be closed and the web application may be notified that the composite data service request failed or partially failed. The data service may partially fail if a portion of the data services executes successfully while another portion of the data services executes unsuccessfully (see e.g., FIG. 7).

In step 504, a result (generated in step 502) is provided to the web application. For example, the result may be: (i) the output specified in the data service contract; (ii) a portion of the output specified in the data service contract; or (iii) an indication that the composite data service request was unsuccessfully processed.

The aforementioned process may be repeated multiple times on a given webpage in the web application and/or may be repeated multiple times within a web application.

Figure 6:
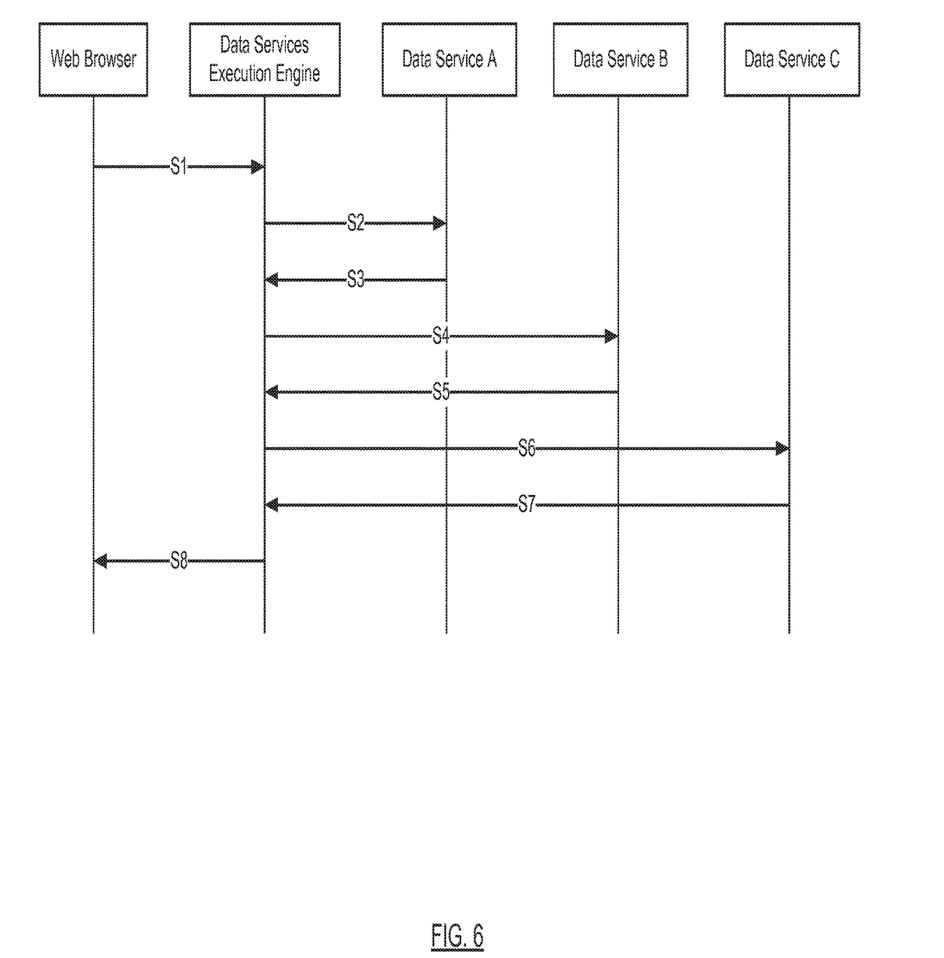
FIGS. 6 and 7 show examples in accordance with one or more embodiments of the disclosed technology.
Figure 7:
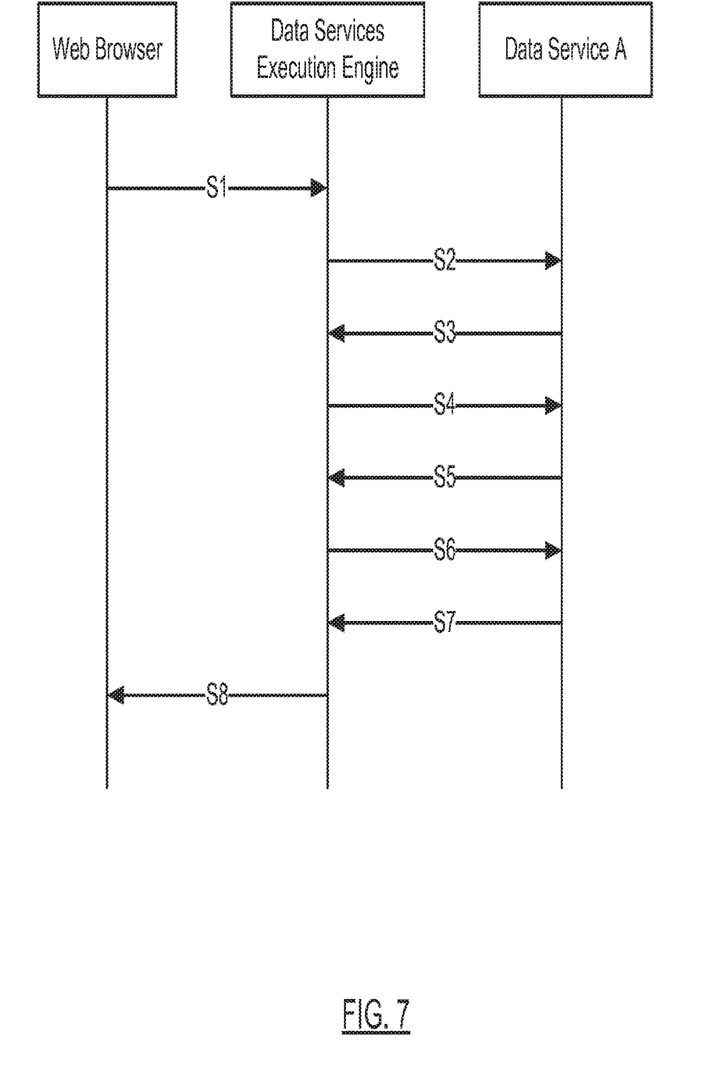

FIGS. 6-7 show examples in accordance with one or more embodiments of the disclosed technology. The examples are not intended to limit the scope of the disclosed technology.

Example 1

Turning to FIG. 6, consider a scenario in which a composite data service includes three data services (data service A, data service B, data service C). Further, the corresponding data service contract specifies the following: (i) the order of execution of the data services is: data service A, data service B, data service C; (ii) the input to the composite data service is the input that is provided to data service A; (iii) the output of the composite data service is the output generated by data service C; and (iv) the execution of the three data services is to be performed as part of a transaction.

The following section describes actions that may be performed in response to receiving a composite data request from a web browser by the data services execution engine (S1). In response to receiving the composite data services request, corresponding data services contract is obtained (not shown) and a transaction is subsequently initiated by the data services execution engine. The initiation of the transaction may include, for example, creating data structures necessary to track the intermediate inputs and outputs generated during the processing of the composite data service request.

Once the transaction is initiated, the data services execution engine issues a first data service request (e.g., an HTTP request; see e.g., FIG. 5, step 500) to data service A that includes the input received as part of the composite data service request (S2). Data service A subsequently receives, processes and returns a first intermediate output to the data services execution engine (S3).

The data services execution engine subsequently stores the first intermediate output. In accordance with the data services contract, the data services execution engine issues a second data service request (e.g., an HTTP request; see e.g., FIG. 5, step 500) to data service B that includes the first intermediate output as input to data service B (S4). Data service B subsequently receives, processes and returns a second intermediate output to the data services execution engine (S5).

The data services execution engine subsequently stores the second intermediate output. In accordance with the data services contract, the data services execution engine issues a third data service request (e.g., an HTTP request; see e.g., FIG. 5, step 500) to data service C that includes the second intermediate output as input to data service C (S6). Data service C subsequently receives, processes and returns the output to the data services execution engine (S7).

The output is subsequently provided to the web browser (S8) and the data services execution engine closes the transaction. The closing of the transaction may include discarding the intermediate outputs generated during the processing of the composite data structure request.

Example 2

Turning to FIG. 7, consider a scenario in which a composite data service includes one data service (data service A). Further, the corresponding data service contract specifies the following: (i) the input to the composite data service is a set of values that need to be individually processed by the data service A, and (ii) data service A is to be called n times, where n is the size of the input set.

In S1, the web browser sends the following set of data {a,b,c} in a composite data service request. The data services execution engine receives the request and obtains the corresponding data service contract (not shown). After obtaining the data service contract, the data services execution engine evaluates the data service contract and determines that n number of requests need to be issued to data service A, where n is the size of the set of data specified in the input of the composite data service request. Based on this determination, the data services execution engine determines that n=3.

The data services execution engine subsequently proceeds to issue three separate requests (S2, S4, S6) to data service A and receives three corresponding responses (S3, S5, and S7). In this example, assume that S3 and S7 indicate successful execution of the data service request and S5 indicates that the data service request failed. In this scenario, because the individual requests are independent of each other, data services execution engine may send a response/result back to the web browser which indicates that {a,c} were successfully processed but that {b} was unsuccessfully processed.

Embodiments of the technology may be implemented on a computing system. Any combination of mobile, desktop, server, embedded, or other types of hardware may be used.

Figure 8:
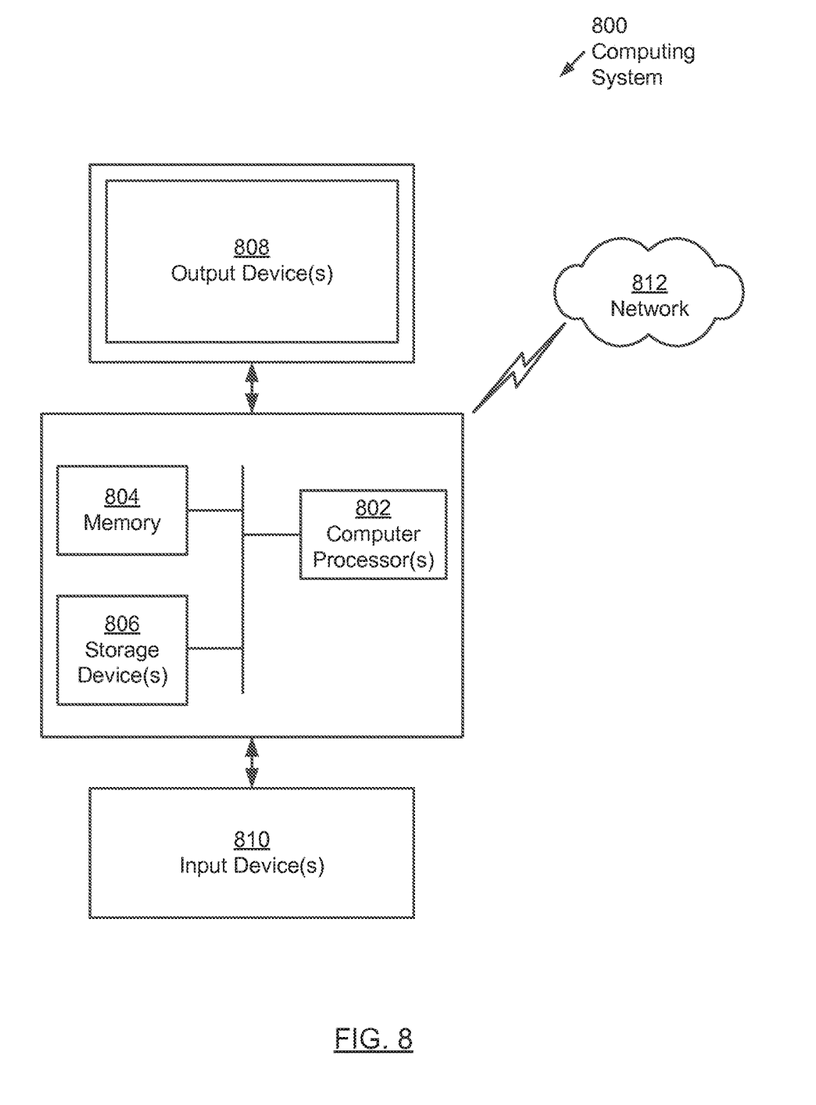
FIG. 8 shows a computing system in accordance with one or more embodiments of the disclosed technology.

For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (800) may be located at a remote location and connected to the other elements over a network (812). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the disclosed technology has been described with respect to a limited number of embodiments, those skilled in the art, having benefit of this disclosure, will appreciate that other embodiments can be devised which do not depart from the scope of the disclosed technology as disclosed herein. Accordingly, the scope of the disclosed technology should be limited only by the attached claims.

What is claimed is:

1. A method for implementing a composite data service on a webpage in a web application, comprising:
   receiving, from a requesting entity, a composite data service request specifying a set of inputs;
   in response to the composite data service request:
      creating a transaction associated with the composite data service request;
      obtaining a data service contract associated with the composite data service request;
      servicing the composite data service request based on the data service contract to obtain a set of results,
         wherein servicing the composite data service request comprises issuing at least a set of requests to a data service,
         wherein the data service is to be executed a number of times equal to a cardinality of the set of requests,
         wherein each request of the set of requests uses one input of the set of inputs,
         wherein the data service contract specifies the set of inputs for the composite data service, a set of outputs for the composite data service, and a number of times the data service is to be executed,
         wherein the number of times corresponds to a cardinality of the set of inputs,
         wherein the data service is associated with the composite data service,
         wherein the data service contract specifies a rollback action if at least one execution of the number of times the data service is to be executed fails;
   when at least one request of the set of requests to the data service fails;
      obtaining the rollback action from the data service contract; and
      executing the rollback action;
   providing the set of results to the requesting entity; and
   closing the transaction associated with the composite data service request.

2. The method of claim 1, wherein the requesting entity is executing on an end user device.

3. The method of claim 1, wherein the requesting entity is a second composite data service.

4. The method of claim 1, wherein executing the rollback action comprises generating a failure notification, and wherein providing the set of results to the requesting entity comprises providing the failure notification.

5. The method of claim 1, wherein the data service is a representational state transfer (REST)ful web service.

6. The method of claim 1, wherein a state associated with the composite data service is maintained by a data services executing engine.

7. The method of claim 1, wherein the composite data service request comprises a uniform resource identifier (URI) associated with the composite data service.

* * * * *